(12) United States Patent
Bigou

(10) Patent No.: US 12,669,695 B2
(45) Date of Patent: Jun. 30, 2026

(54) ADJUSTABLE-MAGNIFICATION VIEWING SYSTEM

(71) Applicant: THALES, Courbevoie (FR)

(72) Inventor: Damien Bigou, Saint Heand (FR)

(73) Assignee: THALES, Courbevoie (FR)

( * ) Notice: Subject to any disclaimer, the term of this patent is extended or adjusted under 35 U.S.C. 154(b) by 399 days.

(21) Appl. No.: 18/284,845

(22) PCT Filed: Apr. 1, 2022

(86) PCT No.: PCT/EP2022/058760
§ 371 (c)(1),
(2) Date: Sep. 28, 2023

(87) PCT Pub. No.: WO2022/207909
PCT Pub. Date: Oct. 6, 2022

(65) Prior Publication Data
US 2024/0184091 A1 Jun. 6, 2024

(30) Foreign Application Priority Data

Apr. 1, 2021 (FR) ...................................... 2103380

(51) Int. Cl.
| | |
|---|---|
| *G02B 23/04* | (2006.01) |
| *F41G 1/30* | (2006.01) |
| *F41G 1/38* | (2006.01) |
| *G02B 5/122* | (2006.01) |
| *G02B 17/08* | (2006.01) |
| *G02B 27/28* | (2006.01) |
| *G02F 1/139* | (2006.01) |

(52) U.S. Cl.
CPC ......... *G02B 23/04* (2013.01); *G02B 17/0804* (2013.01); *G02B 27/283* (2013.01); *G02F 1/1393* (2013.01); *F41G 1/30* (2013.01); *F41G 1/38* (2013.01); *G02B 5/122* (2013.01)

(58) Field of Classification Search
CPC .. G02B 23/04; G02B 17/0804; G02B 27/283; G02B 5/122; G02B 23/10; G02B 27/10; G02B 27/1066; G02F 1/1393; F41G 1/30; F41G 1/38; F41G 1/027
See application file for complete search history.

(56) References Cited

U.S. PATENT DOCUMENTS

| | | | |
|---|---|---|---|
| 2018/0275410 A1 | 9/2018 | Yeoh et al. | |
| 2019/0219813 A1* | 7/2019 | Summerfield | .......... F41G 1/345 |
| 2022/0269072 A1* | 8/2022 | Stratton | ................. G02B 17/08 |

FOREIGN PATENT DOCUMENTS

WO 2018/057872 A1 3/2018

\* cited by examiner

*Primary Examiner* — Thomas K Pham
*Assistant Examiner* — Jennifer A Jones
(74) *Attorney, Agent, or Firm* — BakerHostetler

(57) ABSTRACT

A scope observing a scene includes a first optical sub-assembly, being an afocal module, and a second optical sub-assembly, being a display module. The afocal module includes: a removable and switchable linear polarizer, a first polarization-splitting element, and an afocal optical system arranged to collect light reflected by the first polarization-splitting element. The display module includes: a half-wave plate, being a distribution plate, a display, an optical objective to collimate the display light; and a second polarization-splitting element arranged after the distribution half-wave plate.

14 Claims, 15 Drawing Sheets

ADJUSTABLE-MAGNIFICATION VIEWING SYSTEM

CROSS-REFERENCE TO RELATED APPLICATIONS

This application is a National Stage of International patent application PCT/EP2022/058760, filed on Apr. 1, 2022, which claims priority to foreign French patent application No. FR 2103380, filed on Apr. 1, 2021, the disclosures of which are incorporated by reference in their entireties.

FIELD OF THE INVENTION

The invention relates to reflex sights and more particularly to reflex sights the magnification of which is adjustable.

BACKGROUND

Scopes are mechanical or optical systems that allow a foot soldier to align her or his rifle with a target via a line of sight.

This line of sight may be embodied by the alignment of a rear sight and a front sight in the case of an exclusively mechanical sight. It may also correspond to the axis defined by a reticle placed at the focal point of collimating optics, in the case of an optical scope.

Many electronic, software or network functions underlying the proposed optical architecture may complement this basic function. Among these underlying functionalities, mention may be made of the following examples:

- optoelectronic functionalities: display of augmented-reality or virtual-reality information including: symbology, image fusion for example with a night-vision imaging channel (light intensification or thermal imaging) or with an external video stream,
- software and network functionalities: edge detection, shape recognition, target tracking, geolocation, compass, exchange of video data or metadata with third parties, collaborative combat, threat detection.

To combine or split these functionalities between various optical imaging channels, existing solutions generally use intensity splitting, pupil splitting, mechanical switching or digital fusion. Intensity splitting results in a decrease in luminance in each imaging channel. Pupil splitting has the effect of decreasing the size of the pupil (or field if it is a question of field splitting) in each imaging channel. Mechanical switching does not allow the image to be viewed simultaneously in both channels. Lastly, electronic fusion often requires separate optics, increasing bulk, weight and cost.

Furthermore, scopes are conventionally separated into two categories:

- reflex sights, also known as red dot sights; and
- telescopic sights, also known as telescopic scopes or rifle scopes.

Reflex sights, as they do not employ imaging optics, allow targeting with "both eyes open", allowing a foot soldier to continue to monitor her or his immediate environment while aiming at a target. They are also ideal in situations requiring high reactivity and rapid targeting, unlike telescopic sights with which a foot soldier must position her or his eye at the right distance from the scope, in its exit pupil, in order to be able to aim. Reflex sights are usually complemented by an external afocal magnifying system that increases their bulk and weight. The addition of this element then converts the reflex sight into a telescopic sight and the foot soldier loses the advantages specific to reflex sights. It therefore becomes less comfortable to use because, for high magnification values, for example values higher than ×3 or ×4, the eye box is very often narrower than Ø10 mm and this constrains the foot soldier to position her or his eye precisely in this eye box, behind a telescopic sight, in order to be able to aim. In certain environments, when aiming, the foot solder may also be hindered by Fresnel reflections from bodies of water, windows of buildings or vehicles, etc. Although it is certainly possible to add a polarizer at the entrance of the sight to overcome this problem, such an addition decreases optical transmission by a factor of 2 in the direct optical channel, this decreasing the range of the sight.

In contrast, telescopic sights have other advantages over reflex sights. Some of them, such as the Elcan Specter DR 1×/4× scope, in particular incorporate a bi-afocal magnifying system without significantly modifying their bulk. Other scopes, such as the Sightron SIII SS832X56LRZSMD/CM, incorporate a continuous-zoom magnifying system.

The solution provided by the invention is a reflex sight that advantageously exploits the polarization states of light to achieve a compact and lightweight system allowing the magnification of the image delivered to the eye to be easily varied, while combining a number of functionalities.

SUMMARY OF THE INVENTION

To this end, one subject of the invention is a scope observing a scene, said scope comprising a first optical sub-assembly, called the afocal module, and a second optical sub-assembly, called the display module, said afocal module comprising:

- a removable linear polarizer that is switchable so as to transmit at least a first linear-polarization state of light coming from said scene, called state A, or a second linear-polarization state of said light, called state B, said state B being orthogonal to said state A;
- a first polarization-splitting element arranged to reflect a polarization state A of light transmitted by said linear polarizer;
- an afocal optical system arranged to collect light reflected by said first polarization-splitting element, said afocal optical system comprising:
    - a first catadioptric sub-assembly and a second catadioptric sub-assembly, located on either side of the first polarization-splitting element,
    - first and second retardation plates that are said to be afocal, and that are arranged on the path of the reflected light, on either side of the first polarization-splitting element, the first being placed between the first polarization-splitting element and the first sub-assembly and the second being placed between the first polarization-splitting element and the second sub-assembly,
- said afocal optical system being configured to form an image of the scene with an orientation identical to an orientation of the scene observed by said scope, with a magnification greater than 1, this image being called the magnified image,
- the first polarization-splitting element further being arranged to reflect light delivered by the second sub-assembly, which is called AG light, with a polarization state A, transporting said magnified image such that the axis of sight of the AG light is collinear with a path of light transmitted by the first polarization-splitting element, which is called direct light, with a polarization state B;

said display module comprising:

a half-wave plate, called the distribution plate, that is arranged on the path of the AG light and direct light, after the first polarization-splitting element;

a display configured to form a display image by emitting radiation called display light;

an optical objective configured to collimate said display light;

a second polarization-splitting element arranged, after the distribution half-wave plate, to transmit a polarization state B, of the direct light or of the AG light, while spatially combining it with the collimated display light, so that said scope superposes said unmagnified image or said direct light with said display image.

According to one variant of the invention, the scope of the invention comprises a third module, called the video module, comprising:

a quarter-wave plate, called the imaging plate, and a mirror that are configured to convert a polarization state A of the AG light and direct light reflected by the second polarization-splitting element into a polarization state B, forming light that is called imaging light, the mirror further being arranged so that said imaging light passes through said objective in order to form said magnified image or an image of the scene resulting from direct light, which image is called the unmagnified image, in an image focal plane of said objective;

a third polarization-splitting element arranged to reflect a polarization state A of the display light;

a matrix-array photodetector arranged in the focal plane of said objective and configured to detect said magnified image or said unmagnified image of the scene, the matrix-array photodetector and the display being located on either side of the third polarization-splitting element.

Preferably, in this variant, an orientation of a slow axis of said distribution half-wave plate has a modifiable orientation with respect to a plane of incidence of the second polarization-splitting element and, optionally, the matrix-array photodetector is connected to a processor configured to apply post-processing methods to said image of the scene.

Preferably, in this variant, the scope comprises an electronically controllable liquid-crystal cell configured to introduce a phase delay ranging from 0° to 180° modulo 360°, said liquid-crystal cell being arranged on the optical path of light coming from said scene, after the linear polarizer and before the first polarization-splitting element, said scope comprising a switch connected to a voltage generator controlling said liquid-crystal cell. Preferably, a passing direction of the linear polarizer is orthogonal to a plane of incidence of the first polarization-splitting element, a slow axis of the liquid-crystal cell being oriented at 45° modulo 90° to the plane of incidence of the first polarization-splitting element.

Preferably, the scope comprises a half-wave plate, called the upstream plate, that is located upstream of the linear polarizer and is configured to have a slow axis parallel to the passing direction of the linear polarizer when the latter transmits a polarization state B and to have a slow axis having an orientation of 45° to the passing direction of the linear polarizer when the latter transmits a polarization state A.

Preferably, the afocal module and the video module are removable.

According to a first embodiment of the invention M1, the first and second sub-assemblies of the afocal optical system are configured to form a first real intermediate image of the scene and a second real intermediate image of the scene, respectively, and the first and second afocal retardation plates are quarter-wave plates, the afocal system further comprising:

a first mirror configured to reflect reflected light having passed through the first sub-assembly so as to send it back through the first sub-assembly, a second mirror configured to reflect reflected light having passed through the second sub-assembly so as to send it back through the second sub-assembly.

According to a second embodiment of the invention M2, the first sub-assembly of the afocal optical system is configured to form a real intermediate image of the scene, and the first and second afocal retardation plates are half-wave plates, the afocal system further comprising:

a first reflective element configured to reflect reflected light having passed through the first sub-assembly so as to send it back through the first sub-assembly, a second reflective element configured to reflect reflected light having passed through the second sub-assembly so as to send it back through the second sub-assembly, the first and/or second reflective element being configured to perform a vertical and horizontal inversion of a field of view of the reflected light.

According to one particular embodiment of the second embodiment M2, the first and second reflective elements are reflecting prisms, the first and second reflective elements being configured to perform the vertical and horizontal inversion of the field of view of the reflected light or vice versa, respectively.

Alternatively, according to one particular embodiment of the second embodiment M2, the first reflective element is a corner-cube retroreflector configured to perform the vertical and horizontal inversion of the field of view of the reflected light and the second element is a mirror or the first reflective element is a mirror and the second element is a corner-cube retroreflector configured to perform the vertical and horizontal inversion of the field of view of the reflected light.

According to a third embodiment of the invention M3, the first sub-assembly of the afocal optical system does not form any real intermediate images of the scene, and the first and second afocal retardation plates are quarter-wave plates, the first sub-assembly being formed by a concave mirror configured to reflect reflected light having passed through the first quarter-wave plate, the second sub-assembly being formed by a convex mirror configured to reflect reflected light having passed through the second quarter-wave plate.

According to one particular embodiment of the third embodiment M3, the afocal optical system further comprises an asymmetric refractive component configured to correct eccentricity aberrations introduced by the first polarization-splitting element as reflected light passes therethrough.

BRIEF DESCRIPTION OF THE DRAWINGS

Other features, details and advantages of the invention will become apparent on reading the description given with reference to the appended drawings, which are given by way of example and which show, respectively.

Figure 4A:
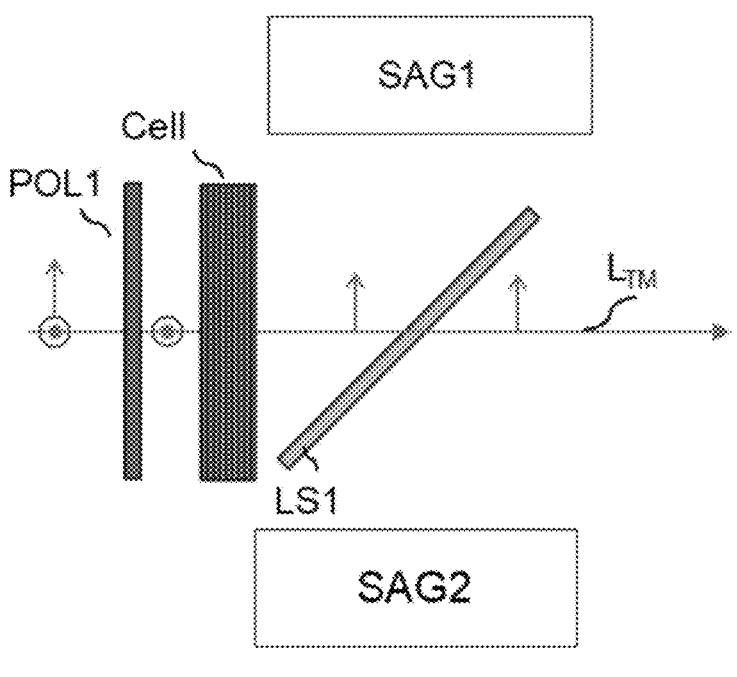
FIG. 4A.
Figure 4B:
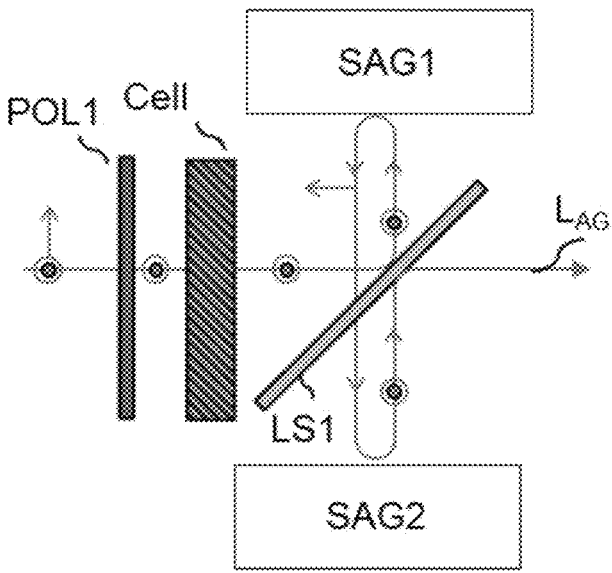

FIG. 4B, a variant of the invention in which the scope LT comprises an electronically controllable liquid-crystal cell Cell configured to introduce a phase delay varying from 0° to 180° modulo 360°,

FIG. 5A,

FIG. 5B and

Figure 5A:
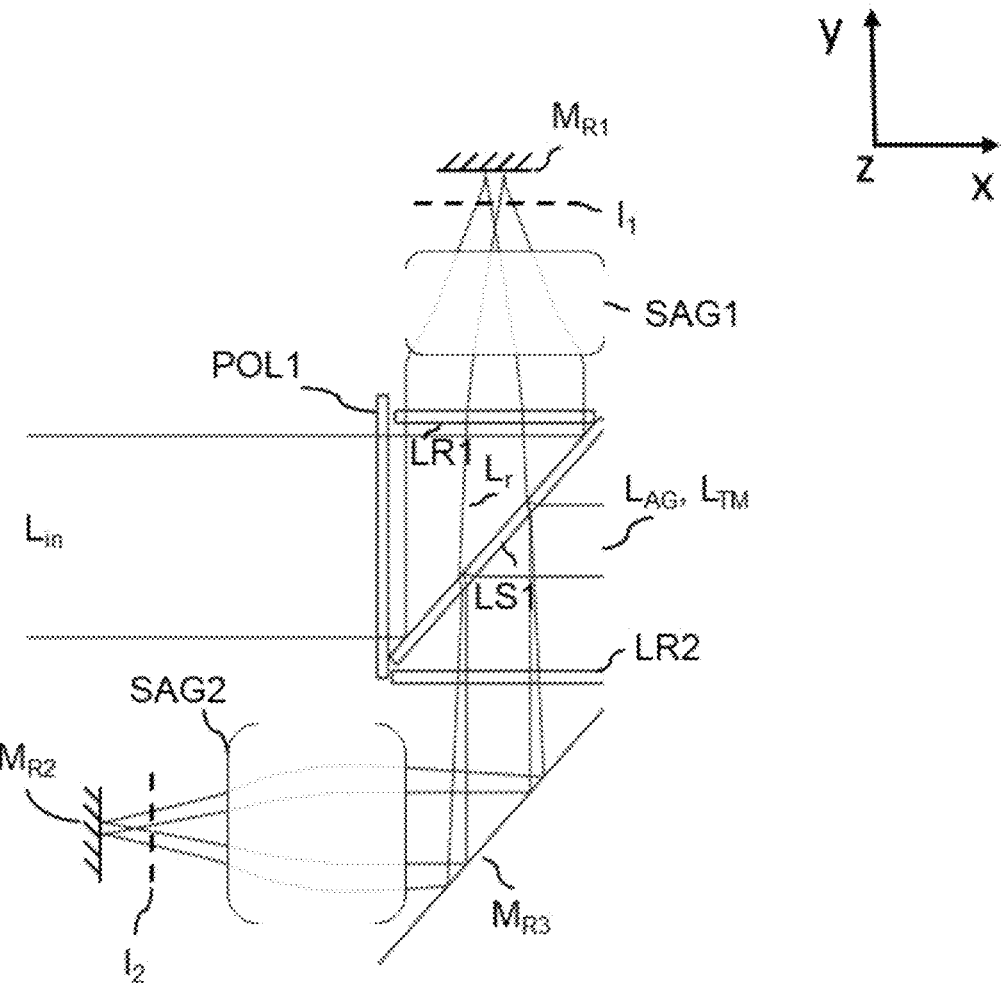
Figure 5B:
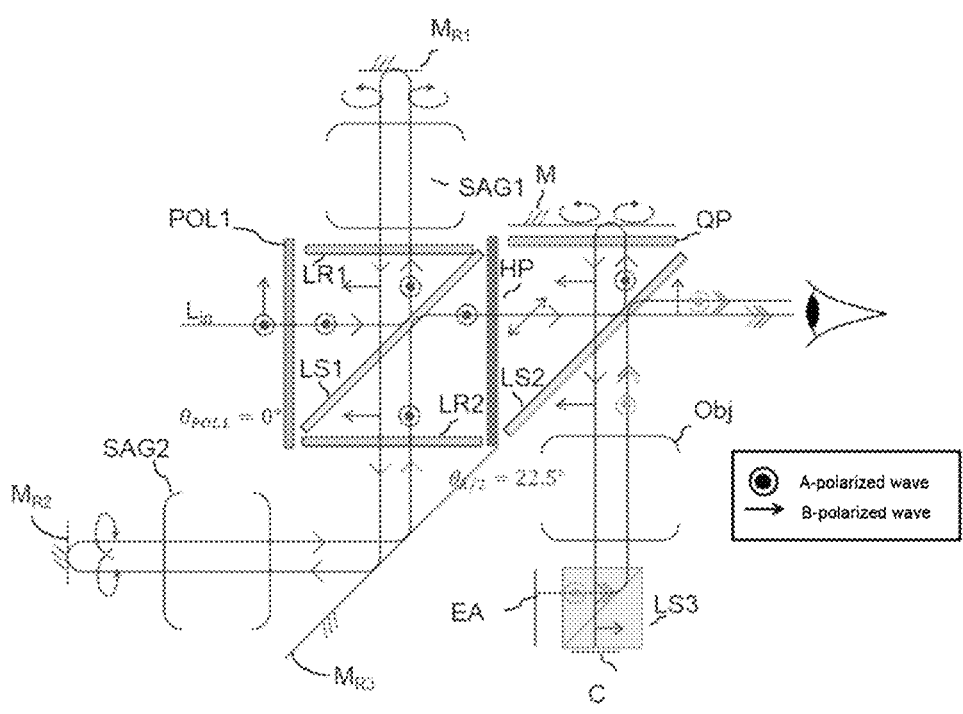
Figure 5C:
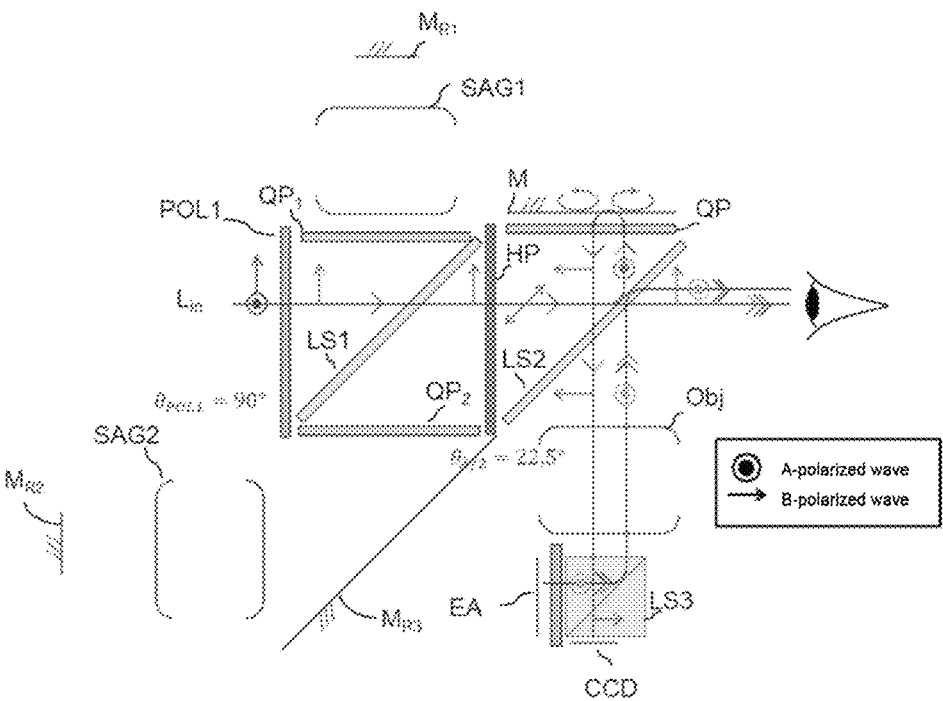

FIG. 5C, a schematic view of a first embodiment of the invention M1 in which the afocal optical system employs double field and pupil transport,

FIG. 6A and

Figure 6A:
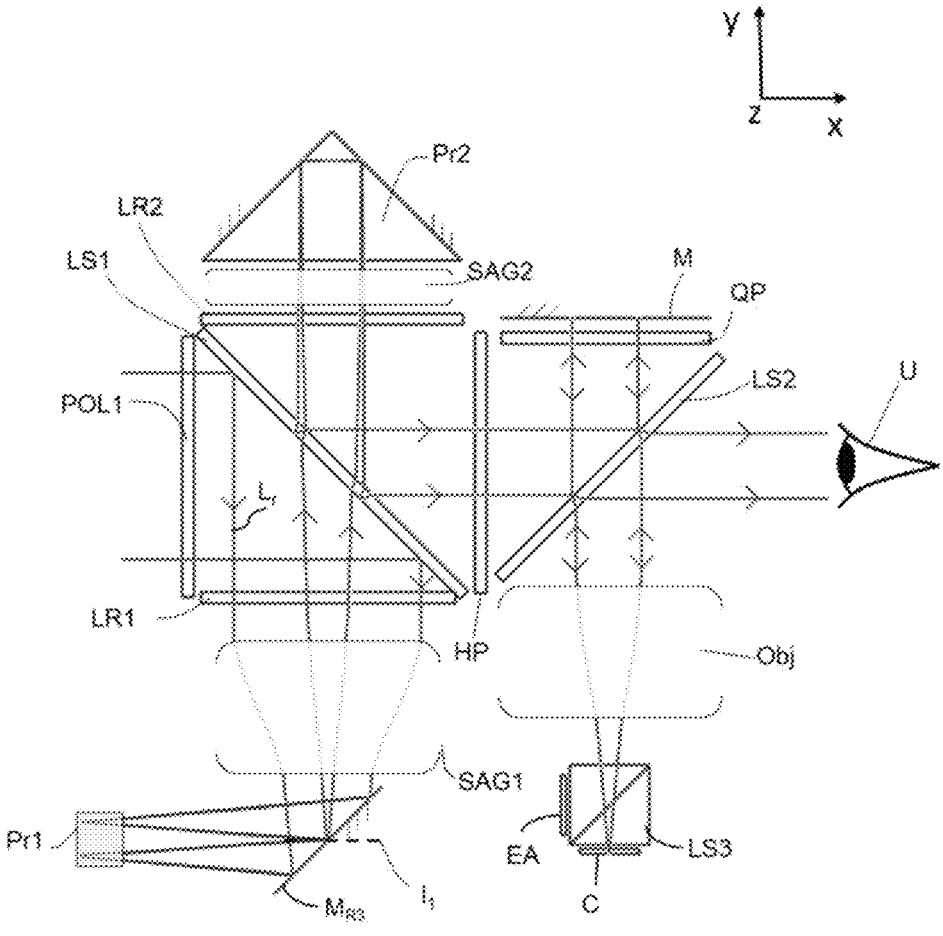
Figure 6B:
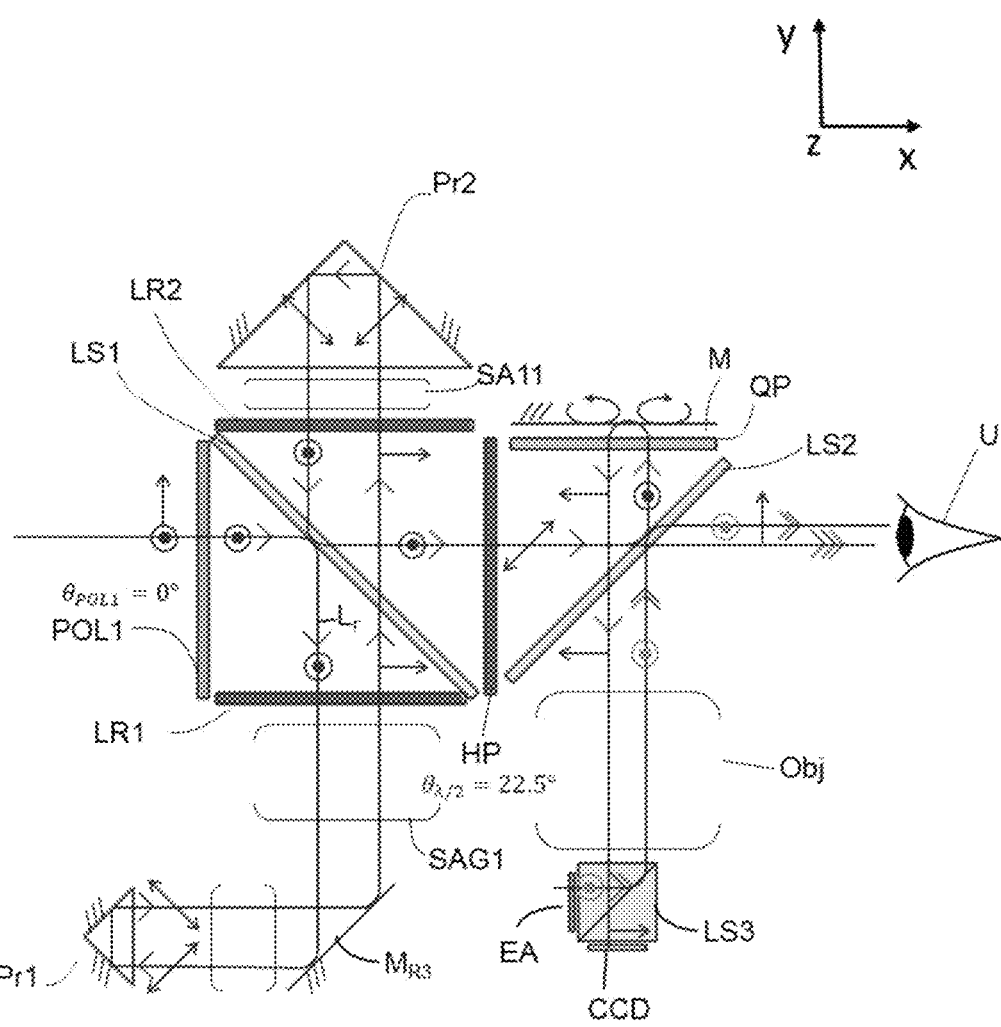

FIG. 6*b*, a schematic view of a second embodiment of the invention M2 in which the afocal optical system is a double-pass Keplerian telescope,

FIG. 7A and

Figure 7A:
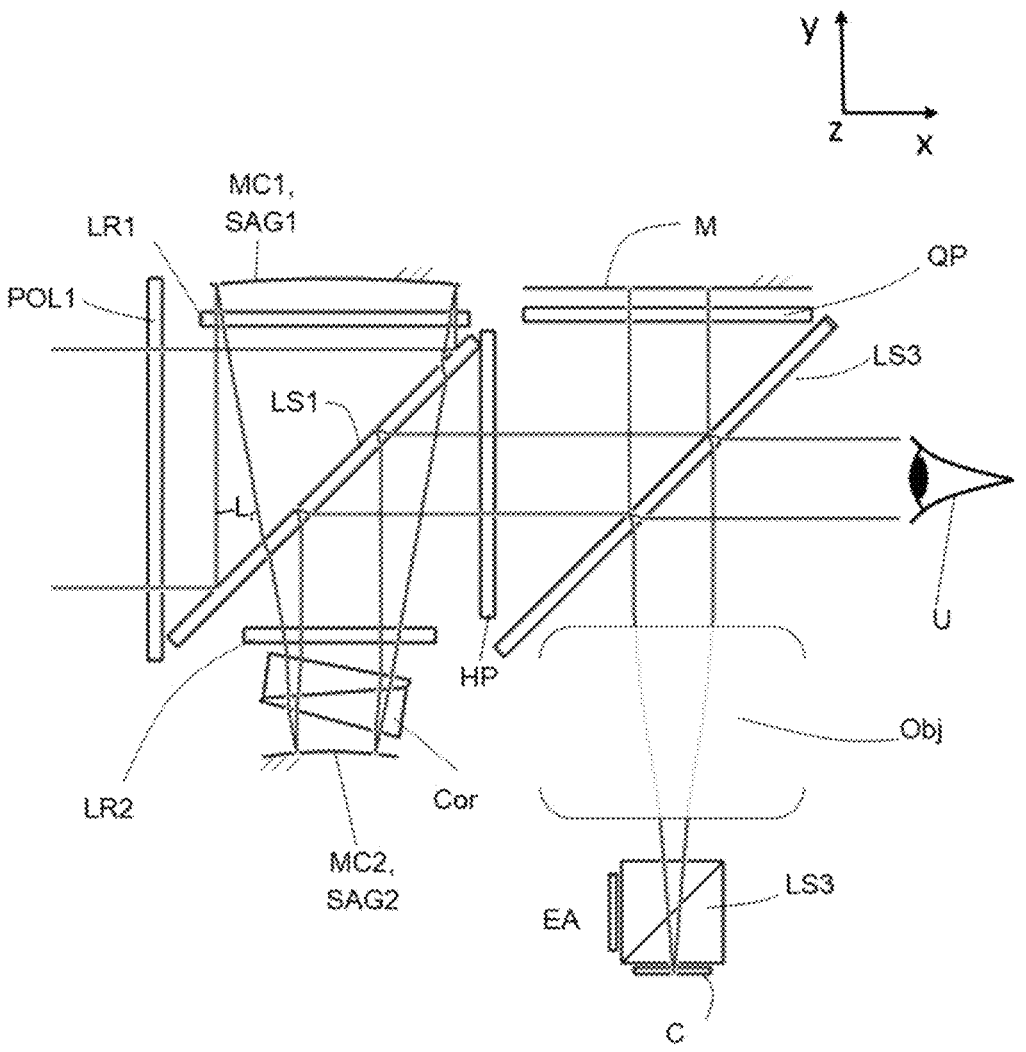
Figure 7B:
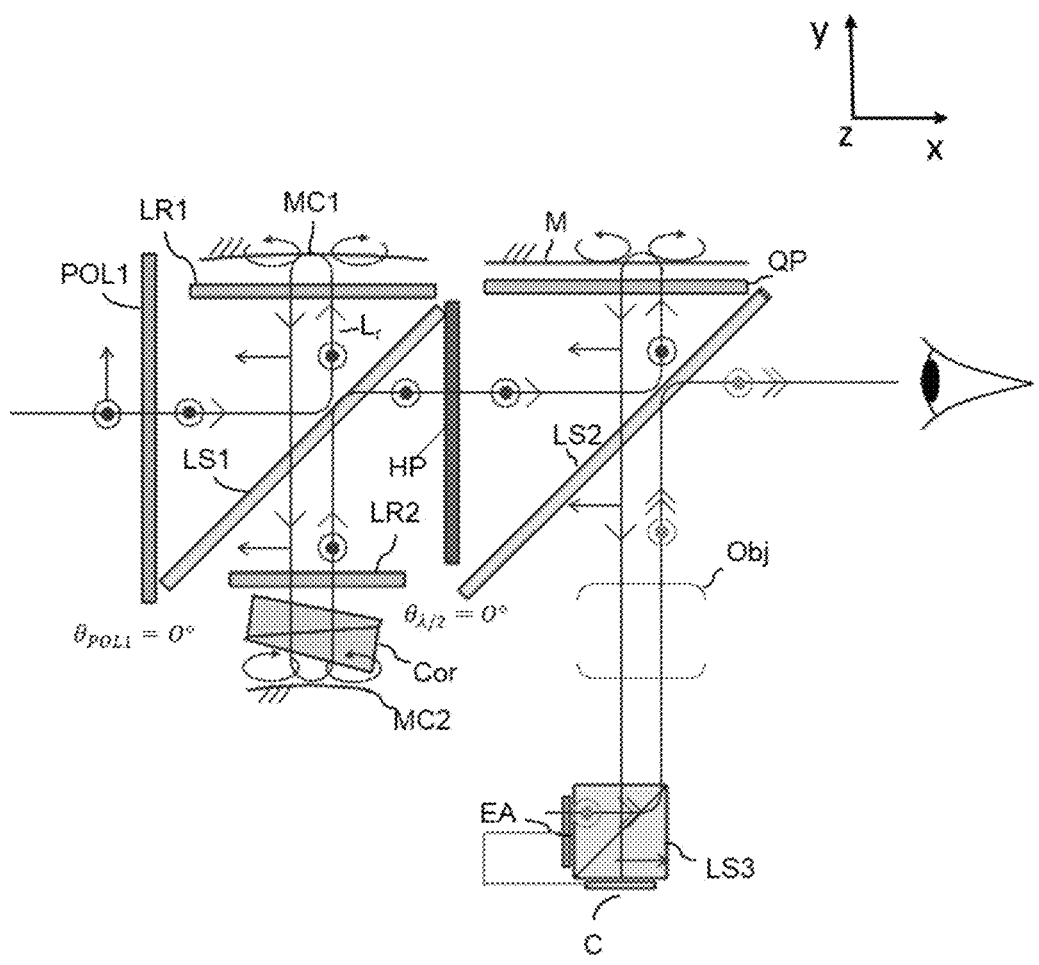

FIG. 7B, a schematic view of a third embodiment of the invention M3 in which the afocal optical system is a double-pass Galilean telescope.

References in the figures, when they are identical, correspond to the same elements.

In the figures, unless otherwise indicated, elements have not been shown to scale.

DETAILED DESCRIPTION

Figure 1:
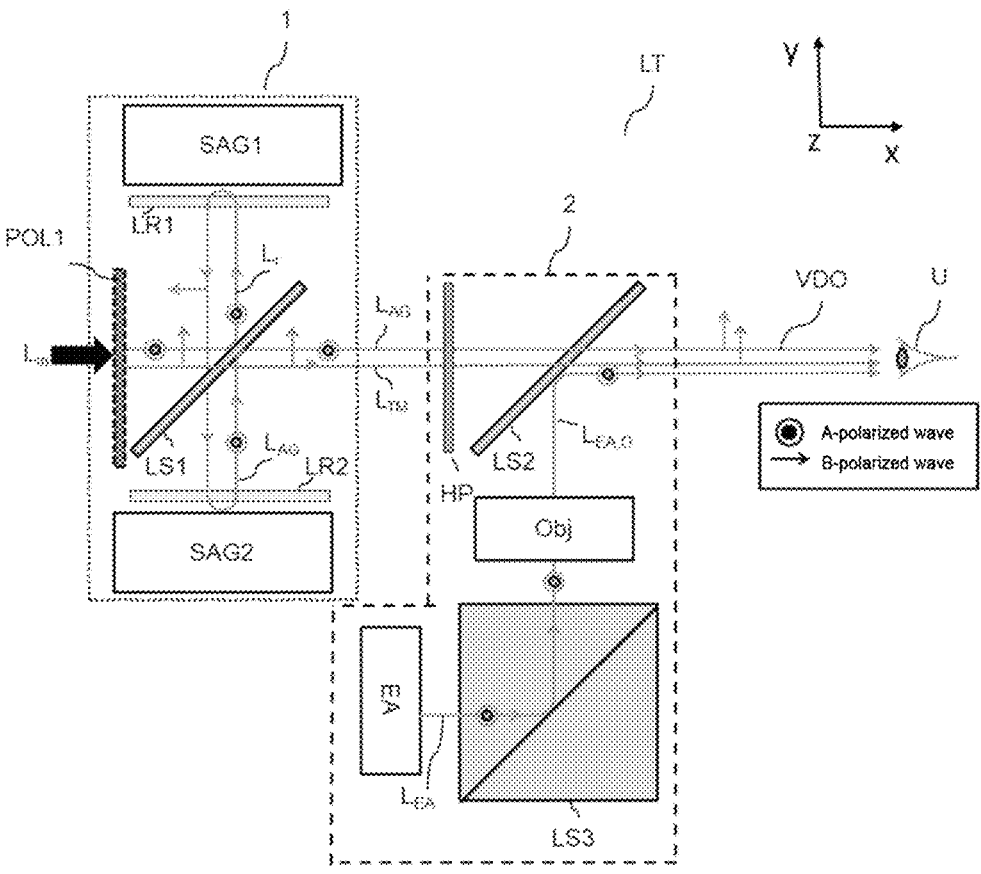
FIG. 1, a schematic view of a scope LT according to the invention.

FIG. 1 shows a schematic view of a scope LT according to the invention. This scope is used by a user U who observes a scene (not shown in FIG. 1) located at infinity with respect to the scope LT. This scope LT comprises a first optical sub-assembly 1, called the afocal module, and a second optical sub-assembly 2, called the display module.

Through an inventive optical architecture of the display module 2 and of the afocal module 1, the scope LT of the invention advantageously exploits the polarization states of light $L_{in}$ coming from the observed scene, in order to obtain a compact, modular and lightweight system that makes it possible to easily vary the magnification of the image delivered to the eye of the user U.

For this purpose, the afocal module 1 comprises a removable linear polarizer POL1 that is switchable so as to transmit a first linear-polarization state of the light $L_{in}$, called state A, or a second linear-polarization state of the light, called state B, state B being orthogonal to said state A. More precisely, the polarizer POL1 of the scope according to the invention is able to adopt at least two different orientations $\theta_{POL1}$ separated by an angle of 90°, in order to transmit a polarization A or B of the light $L_{in}$. For a given luminance $L_0$ entering the afocal module, the polarizer POL1 transmits to its exit a luminance $L_0*\cos^2(\theta_{POL1})$ in polarization A and a luminance $L_0*(1-\cos^2(\theta_{POL1}))$ in polarization B, for a rotation value $\theta_{POL1}$ (orientation) equal to 0° when the passing direction of the polarizer is perpendicular to the xy-plane. By way of non-limiting example, in FIG. 1, when the orientation of POL1 is equal to 0° (modulo 180°), the passing direction of the polarizer is perpendicular to the plane of incidence (xy-plane) and POL1 transmits a polarization A. When the orientation of POL1 is equal to 90° (modulo 180°), the passing direction of the polarizer is parallel to the xy-plane and POL1 transmits a polarization B. In the remainder of the description, the orientation of the retardation plates and of the polarizers will be given with respect to the same reference, i.e. they will have a rotation angle of zero when their passing direction or the direction of the slow axis is orthogonal to the xy-plane.

According to one particular embodiment, the polarizer POL1 is configured to transmit a linear polarization state, TE or TM, of the light $L_{in}$. In the remainder of the description, for sake of concision, reference will merely be made to the general case of the polarizations A or B, but it will be understood that the invention may be implemented with any orthogonal linear polarizations.

The afocal module in addition comprises a first polarization-splitting element LS1 arranged to reflect a polarization state A of light transmitted by the linear polarizer POL1 (and therefore to reflect polarization A). This element LS1 may be a polarization-splitting cube or a polarization-splitting plate.

Furthermore, the afocal module comprises an afocal optical system arranged to collect (A-polarized) light $L_r$, reflected by the first polarization-splitting element LS1. The afocal system comprises a first catadioptric sub-assembly SAG1 and a second catadioptric sub-assembly SAG2, located on either side of the first polarization-splitting element LS1, and first and second retardation plates $LR_1$, $LR_2$ that are said to be afocal, and that are arranged on the path of the reflected light $L_r$, on either side of the first polarization-splitting element LS1. These afocal plates $LR_1$, $LR_2$ are placed between the first polarization-splitting element LS1 and the first sub-assembly and between the first polarization-splitting element LS1 and the second sub-assembly, respectively.

The afocal plates $LR_1$, $LR_2$ are conventional retardation plates, birefringent plates for example. Depending on the embodiment of the invention, these plates $LR_1$, $LR_2$ are either quarter-wave plates (first and third embodiments, see below) or half-wave plates (second embodiment, see below).

The afocal optical system is configured to form an image of the scene with an orientation identical to an orientation of the scene observed with the scope LT, with a magnification greater than 1. This image is called the magnified image. Preferably, the magnification is greater than 3, or even 5. FIGS. 5A to 7B show three embodiments of the invention, each comprising a different afocal optical system with distinct advantages.

By virtue of the arrangement of the plates $LR_1$, $LR_2$, the collimated light delivered by the second sub-assembly SAG2, which is called AG light (denoted $L_{AG}$ in FIG. 1), has a polarization A after passage through the plate $LR_1$. This AG light transports the magnified image of the scene (with a "right" orientation). The first polarization-splitting element LS1 is arranged to reflect the AG light, such that the axis of sight of the AG light is collinear with a path of the light transmitted by the first polarization-splitting element, which is called direct light $L_{TM}$. This light $L_{TM}$ transports the field of view of the scene coming from infinity, unmagnified by the afocal optical system. Thus, judicious use of the polarization state of the light allows a compact afocal module to be obtained that forms the magnified image of the scene—when the polarizer POL1 lets polarization A pass—and that lets the direct light pass with a polarization B when the polarizer POL1 lets polarization B pass.

By way of non-limiting illustration, in FIG. 1, when the orientation of the polarizer makes an angle of 90° modulo 180° to the vertical (in the yz-plane in FIG. 1), it transmits a polarization B and the scope delivers an unmagnified image (reflex-sight configuration). Conversely, when the orientation of the polarizer makes an angle of 0° modulo 180° to the vertical, it transmits a polarization A and the scope delivers a magnified image (telescopic-sight configuration).

The scope LT in addition comprises a display module 2 for superposing an image of the scene with visual information. This display module 2 comprises a display EA configured to emit radiation called display light $L_{EA}$. The display EA allows an image to be displayed, for example a symbol (such as a red dot), a text or even a reticle to be combined with the magnified image or the unmagnified field of view in order to make it easier for the user to aim or in order to deliver information to her or him. The light delivered by the display may be unpolarized or directly A-polarized or it may be A-polarized by a linear polarizer placed on the path of the display light if this light is unpolarized.

The display module 2 comprises an optical objective Obj configured to collimate said display light, which is then called the collimated display light $L_{EA,O}$, and thus form the image of the display reflected at infinity. In addition, the display module 2 comprises a second polarization-splitting element LS2 arranged after the distribution half-wave plate HP on the optical path. This element LS2 is configured to transmit a polarization state B, of the direct light or of the AG light, while spatially combining it with the collimated display light $L_{EA,O}$, thereby forming light referred to as the direct optical channel VDO.

In order to combine the afocal module and the display module, the display module comprises a half-wave plate, called the distribution plate HP, that is arranged on the path of the AG light and direct light, after the first polarization-splitting element LS1. The orientation of the slow axis of this half-wave plate HP is configured so that the AG light or direct light has a non-zero polarization component B after passage through the plate HP, so that it is transmitted by LS2. By way of non-limiting example, the slow axis of the plate HP makes an angle of 22.5° modulo 45° to the vertical so that the polarization of the AG light is linear with an angle of −45° modulo 45° to the vertical after passage through the plate HP.

Combination of the afocal module and display module therefore allows a scope to be obtained that is able to pass from a reflex-sight configuration (unmagnified field of view) to a telescopic-sight configuration (magnified image) and vice versa by simply controlling the orientation of the polarizer POL1, this orientation being easily modified by the user, for example using a simple actuator (such as a thumbwheel or a vernier) placed on the scope (see below).

Depending on the orientation of the polarizer POL1, the user U therefore perceives exiting the scope LT, in the direct channel VDO, a magnified or unmagnified image (formed by the direct light) spatially superposed ("augmented") with the image of the display. The scope of the invention therefore has a compact and modular architecture that may be easily combined with another module, called the video module, making it possible to detect the magnified or unmagnified image in order to carry out image processing with a shape-recognition algorithm, a target-tracking algorithm, etc. (see FIG. 3A). For ease of understanding, the light flux ($L_{TM}$) coming from the scene and transmitted by the afocal system has been denoted the "unmagnified image" (M=1) even though the afocal system does not "form" this image.

In prior-art scopes, addition of an afocal sub-assembly allows a magnification M>1 to be applied to the direct optical channel, within the limits set by the laws of conservation of etendue: if the eye-side field is spread by a factor G, then the size of the exit pupil of the afocal system will be decreased at least by a factor G as well. This results in an exit pupil that is smaller in size when G>1, and often requires the user to rigorously position her or his eye in the plane of this exit pupil, with a good alignment, the user's field of view being decreased by vignetting if this is not done.

Figure 2A:
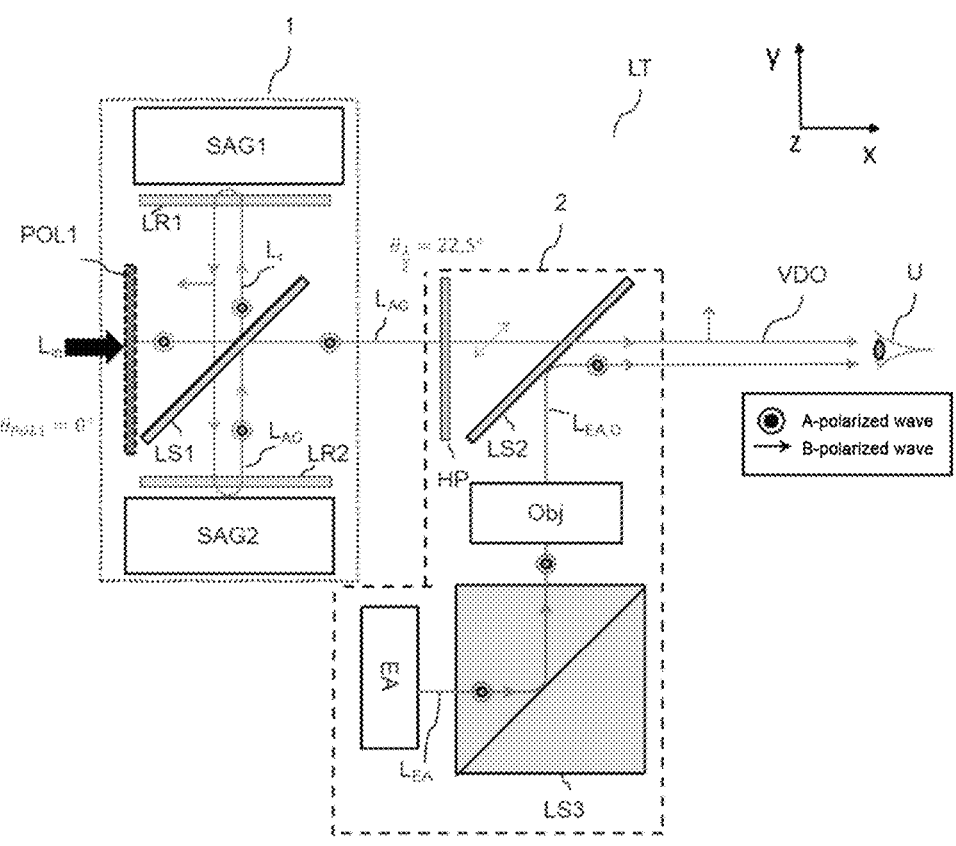
FIG. 2A.
Figure 2B:
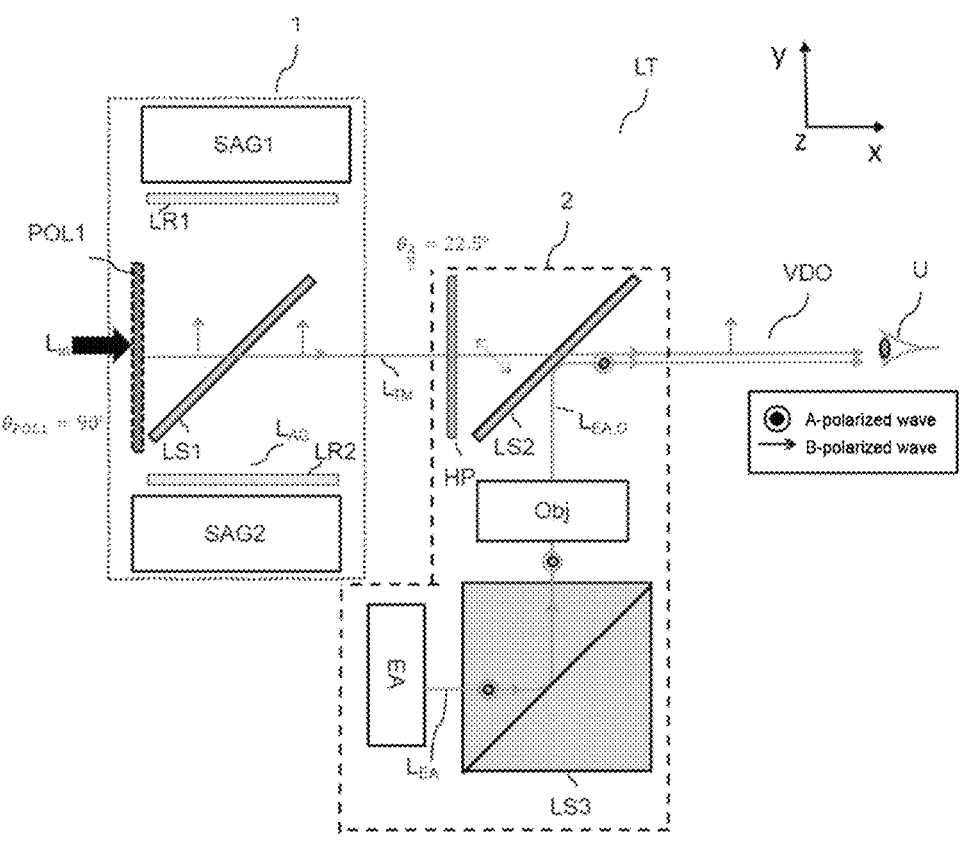
FIG. 2B, the optical path of light through the scope LT when the polarizer lets pass polarization A and polarization B, respectively, FIG. 3A, a preferred variant of the invention in which the scope LT comprises the removable third module called the video module 3, FIG. 3B, the preferred variant of the invention in which the scope LT comprises the removable third module called the video module 3, and in which the orientation of the polarizer POL1 is equal to $\theta_{POL1}=45°$ and the orientation of the slow axis of the distribution plate HP is equal to $\theta_{\lambda/2}=45°$, FIG. 3C, the preferred variant of the invention in which the scope LT comprises the removable third module called the video module 3, and in which the orientation of the polarizer POL1 is equal to $\theta_{POL1}=45°$ and the orientation of the slow axis of the distribution plate HP is equal to $\theta_{\lambda/2}=0°$, FIG. 3D, the preferred variant of the invention in which the scope LT comprises the removable third module called the video module 3, and in which the orientation of the polarizer POL1 is equal to $\theta_{POL1}=0°$ and the orientation of the slow axis of the distribution plate HP is equal to $\theta_{\lambda/2}=0°$.

FIGS. 2A and 2B illustrate the optical path of light through the scope when the polarizer lets pass polarization A and polarization B, respectively.

In FIG. 2A, the polarizer POL1 has an orientation $\theta_{POL1}=0°$ (modulo 180°). It therefore lets pass a polarization A of the light of the scene. The afocal module therefore forms a magnified image of the scene. The half-wave plate HP has an orientation configured so that the AG light passing through it has a non-zero polarization state B. By way of non-limiting example, the plate HP has an orientation $\theta_{\lambda/2}=22.5°$ so that the polarization of the AG light is linear with an angle of −45° modulo 45° to the vertical after passage through the plate HP. Half of the luminous flux of the AG light is therefore transmitted by the element LS2 in the optical channel VDO. The channel VDO perceived by the user is therefore a spatial superposition of the magnified image of the scene and of the display image.

In FIG. 2B, the polarizer POL1 has an orientation $\theta_{POL1}=90°$ (modulo 180°). It therefore lets pass a polarization B of the light of the scene. The afocal module therefore transmits the direct light $L_{TM}$. The half-wave plate HP has an orientation configured so that the direct light passing through it has a non-zero polarization state B. By way of non-limiting example, the plate HP has an orientation $\theta_{\lambda/2}=22.5°$ so that the polarization of the direct light is linear with an angle of 45° modulo 45° to the vertical after passage through the plate HP. Half of the luminous flux of the direct light is therefore transmitted by the element LS2 in the optical channel VDO. The light VDO perceived by the user is therefore a spatial superposition of the unmagnified field of view of the scene and of the display image.

Preferably, the plate HP has an orientation that is modifiable and controllable by the user, using a thumbwheel for example, in order to make it possible to control the ratio of the light intensity of $L_{TM}$ and $L_{AG}$ transmitted, with respect to the intensity of the collimated display light $L_{EA,O}$, by the element LS2.

According to one particular embodiment, the first polarization-splitting element LS1 is configured to reflect a polarization state A equal to TE and to transmit a polarization state B equal to TM. This embodiment is preferred because thus the polarizer POL1 partially or completely prevents propagation through the scope of any natural Fresnel reflections (reflections from vehicle windshields, from bodies of water, etc.) in the unmagnified image. Specifically, such Fresnel reflections are generally partially or completely TE polarized for angles of incidence in the vicinity of Brewster's angle (angle of 56.3° for a refractive index equal to 1.5). Preferably, in this embodiment, the scope comprises a half-wave plate, called the upstream plate, that is located upstream of the linear polarizer POL1. This upstream plate has a modifiable orientation. It is configured to have a slow axis parallel to the passing direction of the linear polarizer POL1 when the latter transmits a TM polarization state and to have a slow axis having an orientation of 45° to the passing direction of the linear polarizer POL1 when the latter transmits a TE polarization state. This upstream plate thus makes it possible to remove Fresnel reflections from the magnified image.

According to one embodiment, an optional third polarization-splitting element LS3 is added (such as illustrated in FIG. 1), this third polarization-splitting element being arranged to reflect a polarization state A of the display light toward the objective Obj. This element LS3 allows a path of the display light to be folded, thus making the scope more compact.

The polarizer POL1 is a conventional polarizer chosen from a dichroic polarizer, a wire-grid polarizer, a Brewster polarizer, a thin-film polarizer or any other type of polarizer known to those skilled in the art.

Figure 3A:
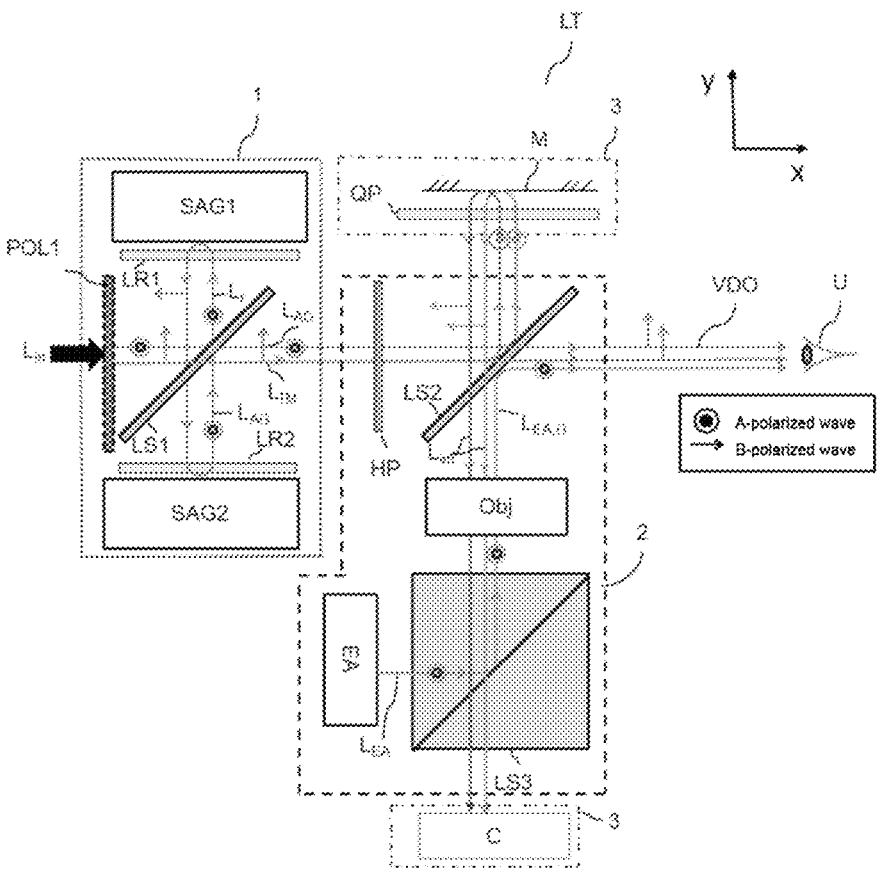

FIG. 3A illustrates a preferred variant of the invention in which the scope LT comprises the removable third module called the video module 3. This module comprises a quarter-wave plate, called the imaging plate QP, and a mirror M. These elements are arranged to convert a polarization state A of the AG light $L_{AG}$ and direct light $L_{TM}$ reflected by the second polarization-splitting element LS2 into a polarization state B, forming light that is called imaging light $L_{im}$. In order to make the scope more compact and to limit the number of optical components, the mirror M is arranged so that the imaging light passes through the objective Obj in the opposite direction to the path of the light $L_{E4}$. The objective thus forms the magnified image or an image of the scene resulting from direct light, which image is called the unmagnified image, in the image focal plane of said objective.

In order to detect this magnified or unmagnified image of the scene, the video module comprises a matrix-array photodetector C (or sensor) arranged in the focal plane of the objective. In order to spatially separate the position of the detector C and of the display EA, both of which are placed in a focal plane of the objective, the video module comprises a third polarization-splitting element LS3 arranged to reflect a polarization state A of the display light. The matrix-array photodetector and the display are located on either side of the third polarization-splitting element LS3.

Preferably, the plate HP has a modifiable orientation in order to make it possible to control the light intensity of the AG light $L_{AG}$ or direct light $L_{TM}$ transmitted by the second splitting element LS2, with respect to the intensity of the collimated display light $L_{EA,O}$ reflected by the second splitting element LS2. Thus, the orientation of the plate HP allows the relative luminance level of the AG or direct light with respect to the light of the display to be adjusted, for example with a view to delivering a brighter image to the user under conditions such that the scene is dimly illuminated.

In addition, the orientation of the plate HP makes it possible to control the ratio R of the light intensity of the AG light $L_{AG}$ or direct light $L_{TM}$ transmitted by the second splitting element LS2 to the user with respect to the intensity delivered to the sensor C. This has the effect of modulating the amount of light delivered to the direct optical channel VDO or to the video-recording channel, either for the unmagnified or for the magnified image. Specifically, for a given luminance $L_1$ exiting the afocal module, the half-wave plate HP transmits a luminance $L_1*\cos^2(2*\theta_{\lambda/2})$ of the unmagnified or magnified image to the user and transmits a luminance $L_1*(1-\cos^2(2*\theta_{\lambda/2}))$ to the video-recording channel. By way of reference, the angle $\theta_{\lambda/2}$ is equal to 0° when the slow axis of the half-wave plate is orthogonal to the xy-plane. The ratio R is therefore equal to $R=\cos^2(2*\theta_{\lambda/2})/(1-\cos^2(2*\theta_{\lambda/2}))$.

By way of non-limiting example, in FIG. 3A, the slow axis of the plate HP makes an angle of $\theta_{\lambda/2}=22.5°$ modulo 45° so that the ratio R is equal to 1, whether the polarizer transmits a polarization A or B.

By virtue of the video module of the scope of FIG. 3A, it is possible to record, via the video channel, images or videos of the scene that may then be used for shape recognition, target tracking, or quite simply image capture with a view to operational debriefing, while simultaneously observing an image of the scene through the direct optical channel (VDO).

As mentioned above, it is the orientation of the polarizer POL1 that determines whether the sensor C detects the magnified image or the unmagnified image. Thus, the same unmagnified image is delivered to the direct optical channel and the video channel when the orientation of the polarizer POL1 makes an angle of 90° modulo 180° to the vertical (i.e. $\theta_{POL1}=90°$ modulo 180°) and when the slow axis of the plate HP has an orientation $\theta_{\lambda/2}=22.5°$ for example (as in FIG. 2B). Alternatively, the same magnified image is delivered to the direct optical channel and the video channel when the orientation of the polarizer POL1 makes an angle of 0° modulo 180° to the vertical (i.e. $\theta_{POL1}=0°$ modulo 180°) and when the slow axis of the plate HP has an orientation $\theta_{\lambda/2}=22.5°$ for example (as in FIG. 2A). This operating mode allows images and videos to be recorded at the same time as the user is aiming.

Figure 3B:
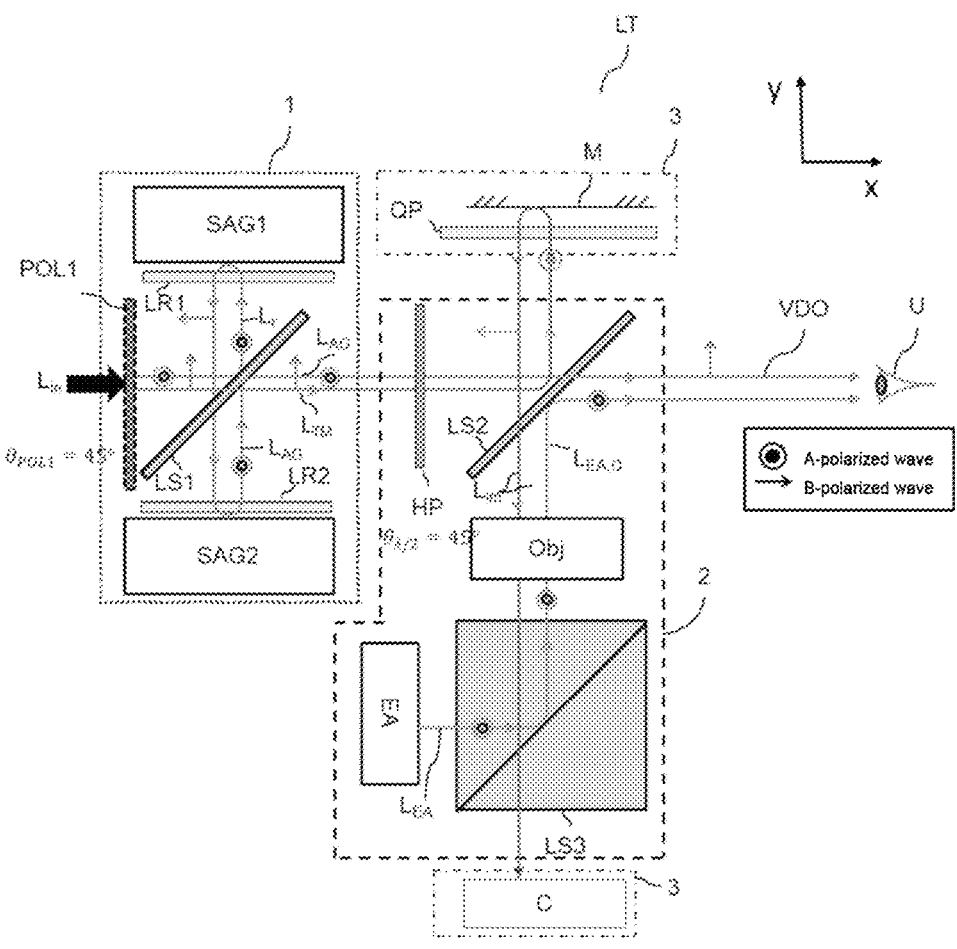

Alternatively, it is possible to deliver the unmagnified image in full to the sensor C and, in parallel, to deliver the magnified image in full to the direct optical channel VDO. This allows the user to achieve a very good visual targeting accuracy using the direct optical channel VDO, by virtue of its narrow field of view, and to apply target-tracking algorithms to a wide field using the video channel. Thus, if the target exits from the narrow field of view of the direct optical channel, it may continue to be tracked in the video channel and target-tracking information are then displayed via augmented reality using the display AF. By way of non-limiting example as illustrated in FIG. 3B, this is possible when the orientation of the polarizer POL1 is equal to $\theta_{POL1}=45°$ modulo 90° and when the orientation of the slow axis of the distribution plate HP is equal to $\theta_{\lambda/2}=45°$ modulo 45°.

It is also possible to deliver the unmagnified image in full to the sensor C and, in parallel, to deliver the magnified image in full to the direct optical channel VDO via a different arrangement. Thus, in another embodiment, the linear polarizer POL1 is removed from the scope, so that the afocal optical system transmits both the direct light and AG light, and the distribution half-wave plate has a slow axis oriented $\theta_{\lambda/2}=45°$ modulo 90°, so that the direct light is totally reflected toward the sensor C and so that the AG light is totally transmitted by the second polarization-splitting element.

Figure 3C:
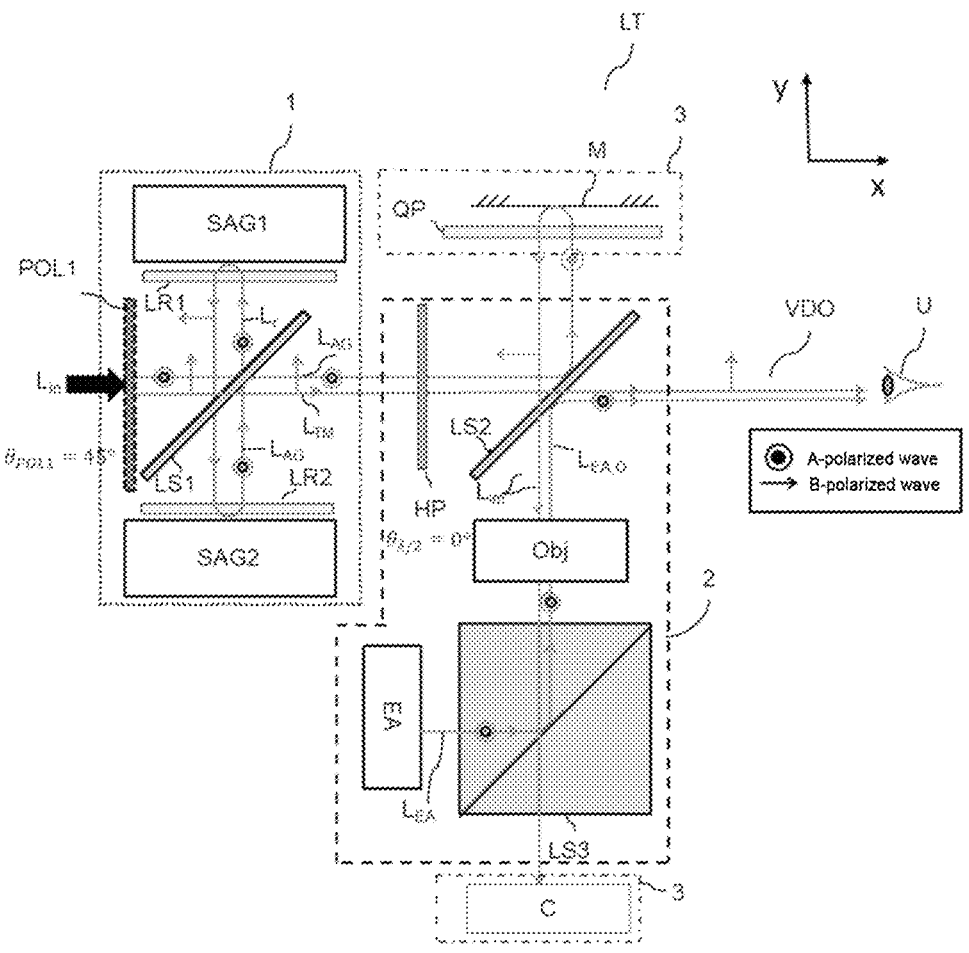

In addition, in the scope of FIG. 3A, it is possible to deliver the unmagnified image in full to the eye and, in parallel, to deliver the magnified image in full to the video channel, for example in order to increase the accuracy of recognition or detection algorithms applied to the video image recorded by the sensor C. By way of non-limiting example illustrated in FIG. 3C, this is possible when the orientation of the polarizer POL1 is equal to $\theta_{POL1}=45°$ modulo 180° and when the orientation of the slow axis of the distribution plate is equal to $\theta_{\lambda/2}=0°$ modulo 45°.

Figure 3D:
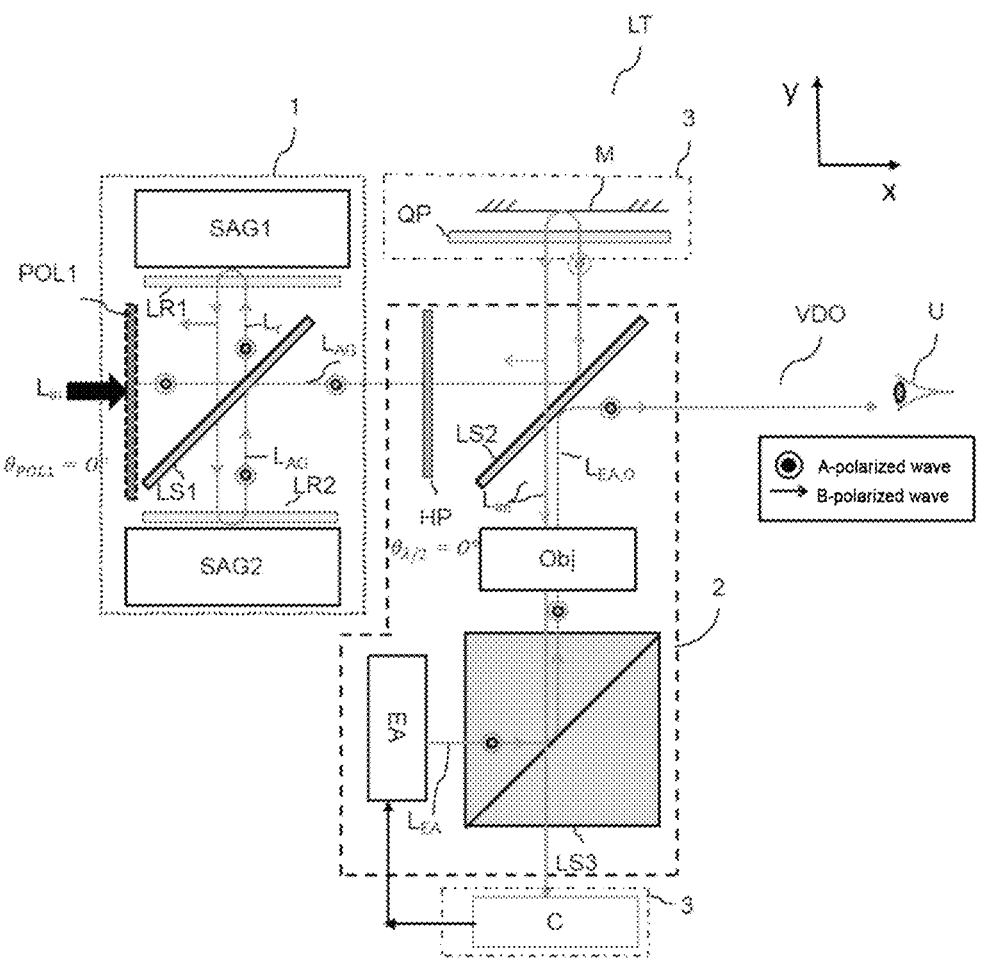

In one embodiment of the scope of FIG. 3A, illustrated in FIG. 3D, the matrix-array photodetector C is connected to the display and to a processor that is configured to apply post-processing methods to the image of the scene detected via the video channel. This embodiment is advantageous with a magnified image. More precisely, in this embodiment, the display forms a virtual image of the magnified scene detected by the photodetector, which will be transmitted to the user U. This image is enriched or processed using algorithms, in order to transmit more information to the user than the "raw" magnified image. This operating mode is a "virtual reality" mode. In this operating mode, the orientation of the distribution plate HP is configured so that 100% of the light intensity of the light $L_{AG}$ is delivered to the sensor C, i.e. reflected by the second polarization-splitting element LS2. No direct light $L_{TM}$ reaches the user, the only image visible to the user being the virtual image of the display EA. In order to ensure 100% of the light intensity of the light $L_{AG}$ is delivered to the sensor C and 0% of the light intensity of the light $L_{TM}$ reaches the user, it is necessary for the orientation of the polarizer POL1 to be identical to the orientation of the slow axis of the distribution plate HP and for $\theta_{POL1}=\theta_{\lambda/2}=0°$ modulo 180°. In this embodiment, the exit pupil will preserve a constant and maximum diameter whatever the magnification applied: this diameter is that of the exit pupil of the objective Obj. The eye relief of the scope LT is therefore not modified during the change of magnification and remains long regardless of the chosen magnification (M=1 or M>1).

FIGS. 4A and 4B illustrate a variant of the invention, in which the scope LT comprises an electronically controllable liquid-crystal cell Cell configured to introduce a phase delay varying from 0° to 180° modulo 360°. This liquid-crystal cell is arranged on the optical path of the light $L_{in}$ coming from the scene, after the linear polarizer POL1 and before the first polarization-splitting element. In addition, the scope comprises a switch connected to a voltage generator controlling the liquid-crystal cell. Thus, the change of magnification is achieved electronically by the user, via a remote switch, rather than manually by turning the input polarizer as mentioned above.

In FIG. 4A, no voltage is being supplied to the cell Cell, which is subjected to an electric field E of zero, and the liquid crystals have their molecules oriented parallel to the faces of the cell, generating a birefringence such that, for a cell of given thickness e, the cell introduces a phase shift equal to $\pi+2k\pi$ (integer k) along the optical axis of the sight. The liquid-crystal cell then behaves as a half-wave plate, transmitting a polarization state orthogonal to the incident state. In other words, the passing direction of the polarizer POL1 is orthogonal to a plane of incidence of the first polarization-splitting element ($\theta_{POL1}=0°$) and a slow axis of the liquid-crystal cell is oriented at 45° modulo 90° to the plane of incidence of the first polarization-splitting element ($\theta_{Cell}=45°$ modulo 90°). The afocal module transmits light coming from the scene—for the sake of simplicity it is considered that it thus "forms" an unmagnified image of the scene.

In FIG. 4B, the switch has been actuated and the cell Cell is being supplied with a voltage and is thus subjected to an electric field E such that the liquid crystals are oriented so as to negate their birefringence along the optical axis of the scope LT. The polarization state transmitted by the cell is therefore not changed and the afocal module thus forms a magnified image of the scene and the magnified image is delivered to the user's eye and/or to the video-recording channel.

It is of course possible to invert the direction of operation of the cell, so that the cell does not modify the polarization of the light when the E-field is zero, and so that it behaves as a half-wave plate transmitting a polarization state orthogonal to the incident state in the presence of a particular E-field. However, the operating mode illustrated in FIG. 4A is preferable because, in the event of malfunction of the voltage generator, the unmagnified image is perceived by the user. This is a more versatile operating mode and therefore the preferred default mode.

FIGS. 5A, 5B and 5C schematically illustrate a first embodiment of the invention M1 in which the afocal optical system employs double field and pupil transport. More precisely, FIG. 5A shows the rays traced when the afocal module forms a magnified image. FIG. 5B shows the polarization states and the direction of propagation of the light rays when the scope forms a magnified image. FIG. 5C shows the polarization states and the direction of propagation of the light rays when the scope forms an unmagnified image. The components described above will not be described again for the sake of concision.

In the first embodiment M1, the first and second sub-assemblies SAG1, SAG2 of the afocal optical system are configured to form first and second real intermediate images $I_1$, $I_2$ of the scene, respectively. In addition, the first and second afocal retardation plates LR1, LR2 are quarter-wave plates. The afocal system further comprises a first mirror $M_{R1}$ configured to reflect reflected light Lr having passed through the first sub-assembly so as to send it back through the first sub-assembly and a second mirror $M_{R2}$ configured to reflect reflected light Lr having passed through the second sub-assembly so as to send it back through the second sub-assembly. By way of non-limiting example, in the first embodiment, the mirrors $M_{R1}$ and $M_{R2}$ are configured so as not to modify the polarization of the light. In the contrary case, thin-film treatments on the catadioptric elements of the scope and the phase delays and orientations of the retardation plates will be optimized so as to maximize overall optical transmission in the various imaging channels.

The light $L_{in}$ first passes through the polarizer POL1, which transmits only the linear-polarization state aligned with the passing axis of the polarizer. The user may freely change the orientation of the passing axis of the polarizer. In the case of FIG. 5B, $\theta_{POL1}=0°$ and polarization A is transmitted, whereas in FIG. 5C $\theta_{POL1}=90°$ and polarization B is transmitted. In FIG. 5B, the polarization state B is reflected by the first polarization-splitting element then passes through the retardation plate LR1 (quarter-wave plate), which converts it into a right-handed circular polarization. The light then passes a first time through the sub-assembly SAG1, which does not affect the polarization states, then is reflected from the mirror MR1, which converts the polarization state into a left-handed circular polarization state through inversion of the direction of propagation of the light, then passes back through the sub-assembly SAG1 then the plate LR1 to finally exit B-polarized. The first image of the intermediate field I1 is formed during passage through this first optical unit.

The B-polarized light passes through the first polarization-splitting element LS1 and is converted into left-handed circular polarization after having passed through the phase retardation plate LR2 (a quarter-wave plate here). This light is reflected from the mirror MR3, then passes a first time through the sub-assembly SAG2, which does not affect the polarization states, then is reflected from the mirror MR2, which converts the polarization state into a right-handed circular polarization state through inversion of the direction of propagation of the light, then passes back through the sub-assembly SAG2 then the plate LR2 to finally exit A-polarized. The second image of the intermediate field I2 is formed during passage through this second optical unit allowing the image of the scene formed by the afocal module to be rectified. The MR3 mirror is optional and allows the optical path to be bent in order to make the afocal module more compact.

In the embodiment where the reflective treatment of the mirror MR3 phase shifts A-polarized light with respect to B-polarized light, it is preferable to position the quarter-wave plate LR2 between this mirror MR3 and the second sub-assembly SAG2, so that this mirror is struck only by A or B waves, and not by circular polarizations, this preventing the polarization states from being affected by reflection from its surface.

Preferably, the first sub-assembly SAG1 is designed such that passage through the first element LS1 is of low numerical aperture, in order to minimize the eccentricity aberrations introduced by LS1. Typically, this numerical aperture is preferably lower than 0.10.

The rest of the device operates as mentioned above. By way of non-limiting example, in FIGS. 5B and 5C, the orientation of the slow axis of the quarter-wave plates LR1, LR2 is $\theta_{LR1,LR2}=45°$ so that the polarization of the reflected light passes from A to B or from B to A before again passing through the element LS1. In addition, the half-wave plate HP is rotated by an angle $\theta_{\lambda/2}=22.5°$, and the transmitted polarization is linear and oriented at 45°. Thus, when direct or AG light strikes the second element LS2, half of the B-polarized light flux is transmitted to the user's eye and the other B-polarized half is delivered to the video channel (ratio R=1). Thus, in FIG. 5B, 50% of the intensity of the AG light is delivered to the video channel and 50% is transmitted to the direct optical channel VDO. In FIG. 5C, 50% of the direct light is delivered to the video channel and 50% is transmitted to the direct optical channel VDO. The first embodiment M1 has a simple and robust architecture allowing the image of the scene formed by the afocal module to be rectified. However, having to reform a double image of the field and of the pupil means that many optical components must be used if a good correction of aberrations is to be achieved, and may be a drawback in the case where it is desired to decrease the weight and the bulk of this afocal sub-assembly.

FIGS. 6A and 6B schematically illustrate a second embodiment of the invention M2 in which the afocal optical system is a double-pass Keplerian telescope. More precisely, FIG. 6A shows the rays traced within the scope when the afocal module forms a magnified image. FIG. 6B shows the polarization states and the direction of propagation of the light rays when the scope forms a magnified image. Since the operating principle is similar to that of the afocal system of embodiment M1, only how the afocal system of embodiment M2 differs with respect to the afocal system of embodiment M1 will be described below.

In the embodiment M2, the first sub-assembly SAG1 of the afocal optical system is configured to form a real intermediate image $I_1$ of the scene, this image being formed in any plane. In the embodiment M2, the first and second afocal retardation plates LR1, LR2 are half-wave plates. The afocal optical system further comprises a first reflective element $P_{R1}$ configured to reflect reflected light Lr having passed through the first sub-assembly SAG1, so as to send it back through the first sub-assembly. In addition, a second reflective element $P_{R2}$ is configured to reflect reflected light Lr having passed through the second sub-assembly SAG2 so as to send it back through the second sub-assembly. The first and/or second reflective element $P_{R1}$, $P_{R2}$ are configured to achieve a vertical and horizontal inversion of a field of view of the reflected light so that the afocal optical system forms a rectified magnified image of the scene. To this end, the first and second reflective elements are prism reflectors, as illustrated in FIGS. 6A and 6B. One of the prisms $P_{R1}$, $P_{R2}$ must achieve an (up/down) image inversion through folding in the horizontal xy-plane, and the other prism must achieve a (left/right) reversion through folding in the vertical yz-plane. However, for the sake of simplicity, the folds formed by these two prisms have both been shown in the horizontal xy-plane. The up/down image rectification may be achieved using prism $P_{R1}$ or prism $P_{R2}$ and vice versa for left/right image rectification.

Alternatively, the first reflective element $P_{R1}$ is a corner-cube retroreflector configured to achieve the vertical and horizontal inversion of the field of view of the reflected light and the second reflective element $P_{R2}$ is a mirror. The opposite is of course possible, i.e. it is possible for the first reflective element to be a mirror and for the second element to be a corner-cube retroreflector configured to achieve the vertical and horizontal inversion of the field of view of the reflected light.

The rest of the device operates as mentioned above.

By way of non-limiting example, in FIG. 6B, the half-wave plates have a slow axis oriented at an angle $\theta_{\lambda/2}=22.5°$ so that light that has passed through SAG1 and that strikes LS2 is B-polarized and so that light that has passed through SAG2 and that strikes LS2 is A-polarized. In addition, the polarizer POL1 has an orientation $\theta_{POL1}=0°$ and the half-wave plate HP is rotated by an angle $\theta_{\lambda/2}=22.5°$, and the transmitted polarization is linear and oriented at 45°. Thus, when AG light strikes the second element LS2, half of the B-polarized light flux is transmitted to the user's eye and the other B-polarized half is delivered to the video channel (ratio R=1).

This architecture of the embodiment M2 has the advantage of reforming only a single intermediate field image, this making correction of aberrations easier than in the embodiment M1, and has the drawback of being dependent on the phase shifts introduced by the reflections from the faces of the elements Pr1, Pr2 and MR3, which may result in a decrease in optical transmission through the complete afocal system. However, this drawback may be minimized by optimizing the phase delays introduced by these reflections and those of the retardation plates LR1 and LR2.

FIGS. 7A and 7B schematically illustrate a third embodiment of the invention M3 in which the afocal optical system is a double-pass Galilean telescope. More precisely, FIG. 7A shows the rays traced within the scope when the afocal module forms a magnified image. FIG. 7B shows the polarization states and the direction of propagation of the light rays when the scope forms a magnified image 100% of which is delivered to the video channel. Since the operating principle is similar to that of the afocal system of embodiments M1 and M2, only how the afocal system of embodiment M3 differs with respect to the afocal system of embodiments M1 and M2 will be described below. Unlike the optical architecture of embodiment M2, the Galilean telescope does not reform any real field images; therefore, it is not necessary to perform image rectification.

This scope has the advantage of being very compact, but has the drawback of possessing a virtual exit pupil which, in use, means that the field of observation of the magnified image in the direct optical channel VDO is much smaller, including for short eye reliefs. The eye relief and field of view of the direct light and unmagnified image are not however affected in the direct optical channel VDO since in this case the optical path does not pass through the Galilean telescope.

In the embodiment M3, the afocal optical system does not form any real intermediate images of the scene and the first and second afocal retardation plates LR1, LR2 are quarter-wave plates (see FIG. 5B for a description of the polarization states within the scope). In this embodiment M3, the first sub-assembly is formed by a concave mirror MC1 configured to reflect reflected light Lr having passed through the first quarter-wave plate, and the second sub-assembly is formed by a convex mirror MC2 configured to reflect reflected light Lr having passed through the second quarter-wave plate.

The first element LS1 is passed through by the light reflected by the concave mirror MC1, which light forms a convergent beam that introduces strong eccentricity aberrations into the field imaging. Preferably, these eccentricity aberrations are compensated for by introducing an asymmetric element, for example an asymmetric refractive component Cor, without adding eccentricity chromatic aberration or angular deviation to the field imaging.

According to one embodiment, the axis of sight of the scope when the afocal module forms a magnified image may be adjusted by decentering the mirrors MC1 or MC2 or even by modifying the angle of rotation of the component Cor in the horizontal xy-plane or vertical yz-plane.

According to one embodiment, the concave mirror MC1 may be replaced by a Mangin mirror, to compensate for residual spherical aberration.

Preferably, the scope LT of the embodiment M3 solves the problem of the much smaller field of observation of the magnified image in the direct optical channel VDO by delivering all the light passing through the afocal module to the video imaging channel (virtual-reality mode mentioned above). Thus, the display connected to the sensor C delivers this image in virtual-reality form to the user's eye. This operating mode is illustrated in FIG. 7B. By way of non-limiting example, this operating mode is possible when the orientation of the polarizer POL1 is identical to the orientation of the slow axis of the distribution plate HP and $\theta_{POL1}=\theta_{\lambda/2}=0°$. This architecture of the embodiment M3 has the advantage of being more compact, lighter and of better optical quality than those of the embodiments M1 and M2. It has the drawback of not being particularly suitable for direct-channel targeting using the magnified image because the exit pupil of the afocal sub-assembly is virtual. It is thus preferable to use a "virtual reality" mode to view the magnified image on the direct path, this making it possible, on the one hand, to obtain a large exit pupil and a long eye relief, and, on the other hand, to be able to adjust the brightness of the display depending on external conditions. However, this mode consumes more power because the camera and the display are used at the same time.

The invention claimed is:

1. A scope (LT) observing a scene, said scope comprising a first optical sub-assembly, being an afocal module, and a second optical sub-assembly, being a display module,
said afocal module comprising:
a removable linear polarizer (POL1) that is switchable so as to transmit at least a first linear-polarization state of light ($L_{in}$) coming from said scene, called state A, or a second linear-polarization state of said light, called state B, said state B being orthogonal to said state A;
a first polarization-splitting element (LS1) arranged to reflect a polarization state A of light transmitted by said linear polarizer; and
an afocal optical system arranged to collect light ($L_r$) reflected by said first polarization-splitting element, said afocal optical system comprising:
a first catadioptric sub-assembly (SAG1) and a second catadioptric sub-assembly (SAG2), located on either side of the first polarization-splitting element, and
a first retardation plate and a second retardation plate ($LR_1$, $LR_2$) that are afocal, and that are arranged on the path of the reflected light (Lr), on either side of the first polarization-splitting element (LS1), the first retardation plate being placed between the first polarization-splitting element (LS1) and the first sub-assembly (SAG1) and the second retardation plate being placed between the first polarization-splitting element (LS1) and the second sub-assembly (SAG2);
said afocal optical system being configured to form an image of the scene with an orientation identical to an orientation of the scene observed by said scope, with a magnification greater than 1, said image being a magnified image,
the first polarization-splitting element (LS1) further being arranged to reflect light delivered by the second sub-assembly (SAG2), being an AG light ($L_{AG}$), with a polarization state A, transporting said magnified image such that an axis of sight of the AG light is collinear with a path of light transmitted by the first polarization-splitting element, being a direct light ($L_{TM}$), with a polarization state B;
said display module comprising:
a half-wave plate, being a distribution plate (HP), that is arranged on the path of the AG light and direct light, after the first polarization-splitting element;
a display (EA) configured to form a display image by emitting radiation, being a display light ($L_{EA}$);
an optical objective (Obj) configured to collimate said display light; and
a second polarization-splitting element (LS2) arranged, after the distribution half-wave plate, to transmit a polarization state B, of the direct light or of the AG light, while spatially combining it with the collimated display light ($L_{EA,O}$), so that said scope superposes said unmagnified image or said direct light with said display image.

2. The scope as claimed in claim 1, further comprising a third module, being a video module, comprising:
a quarter-wave plate, being an imaging plate (QP), and a mirror (M) that are configured to convert a polarization state A of the AG light and direct light reflected by the second polarization-splitting element into a polarization state B, forming light that is being an imaging light ($L_{im}$), the mirror further being arranged so that said imaging light passes through said objective in order to form said magnified image or an image of the scene resulting from direct light, which image is an unmagnified image, in an image focal plane of said objective;
a third polarization-splitting element (LS3) arranged to reflect a polarization state A of the display light; and a matrix-array photodetector (C) arranged in the focal plane of said objective and configured to detect said magnified image or said unmagnified image of the scene, the matrix-array photodetector and the display being located on either side of the third polarization-splitting element.

3. The scope as claimed in claim 2, wherein an orientation of a slow axis of said distribution half-wave plate (HP) has an orientation that is modifiable with respect to a plane of incidence of the second polarization-splitting element (LS2).

4. The scope as claimed in claim 3, wherein the matrix-array photodetector is connected to a processor configured to apply post-processing methods to said image of the scene.

5. The scope as claimed in claim 2, wherein the afocal module and the video module are removable.

6. The scope as claimed in claim 1, comprising an electronically controllable liquid-crystal cell (Cell) configured to introduce a phase delay ranging from 0° to 180° modulo 360°, said liquid-crystal cell being arranged on the optical path of light ($L_{in}$) coming from said scene, after the linear polarizer (POL1) and before the first polarization-splitting element, said scope comprising a switch connected to a voltage generator controlling said liquid-crystal cell.

7. The scope as claimed in claim 6, wherein a passing direction of the linear polarizer is orthogonal to a plane of incidence of the first polarization-splitting element, a slow axis of the liquid-crystal cell being oriented at 45° modulo 90° to the plane of incidence of the first polarization-splitting element.

8. The scope as claimed in claim 1, comprising a half-wave plate, being an upstream plate, that is located upstream of the linear polarizer (POL1) and that is configured to have a slow axis parallel to the passing direction of the linear polarizer (POL1) when the latter transmits a polarization state B and to have a slow axis having an orientation of 45° to the passing direction of the linear polarizer (POL1) when the latter transmits a polarization state A.

9. The scope as claimed in claim 1, wherein the first and second sub-assemblies (SAG1, SAG2) of the afocal optical system are configured to form a first real intermediate image ($I_1$) of the scene and a second real intermediate image ($I_2$) of the scene, respectively, and wherein the first and second afocal retardation plates are quarter-wave plates, the afocal system further comprising:

a first mirror ($M_{R1}$) configured to reflect reflected light (Lr) having passed through the first sub-assembly so as to send it back through the first sub-assembly, a second mirror ($M_{R2}$) configured to reflect reflected light (Lr) having passed through the second sub-assembly so as to send it back through the second sub-assembly.

10. The scope as claimed in claim 1, wherein the first sub-assembly (SAG1) of the afocal optical system is configured to form a real intermediate image ($I_1$) of the scene, and wherein the first and second afocal retardation plates are half-wave plates, the afocal system further comprising:

a first reflective element ($P_{R1}$) configured to reflect reflected light (Lr) having passed through the first sub-assembly so as to send it back through the first sub-assembly, a second reflective element ($P_{R2}$) configured to reflect reflected light (Lr) having passed through the second sub-assembly so as to send it back through the second sub-assembly, the first and/or second reflective element ($P_{R1}$, $P_{R2}$) being configured to perform a vertical and horizontal inversion of a field of view of the reflected light.

11. The scope as claimed in claim 10, wherein the first and second reflective elements are reflecting prisms, the first and second reflective elements ($P_{R1}$, $P_{R2}$) being configured to perform the vertical and horizontal inversion of the field of view of the reflected light or vice versa, respectively.

12. The scope as claimed in claim 10, wherein the first reflective element is a corner-cube retroreflector configured to perform the vertical and horizontal inversion of the field of view of the reflected light and the second element is a mirror or wherein the first reflective element is a mirror and the second element is a corner-cube retroreflector configured to perform the vertical and horizontal inversion of the field of view of the reflected light.

13. The scope as claimed in claim 1, wherein the first sub-assembly (SAG1) of the afocal optical system does not form any real intermediate images of the scene, and wherein the first and second afocal retardation plates are quarter-wave plates, the first sub-assembly being formed by a concave mirror (MC1) configured to reflect reflected light (Lr) having passed through the first quarter-wave plate, and the second sub-assembly being formed by a convex mirror (MC2) configured to reflect reflected light (Lr) having passed through the second quarter-wave plate.

14. The scope as claimed in claim 13, wherein the afocal optical system further comprises an asymmetric refractive component configured to correct eccentricity aberrations introduced by the first polarization-splitting element as reflected light passes therethrough.

* * * * *